(12) United States Patent
Kunkel

(10) Patent No.: US 6,328,884 B1
(45) Date of Patent: Dec. 11, 2001

(54) DEVICE FOR DEGERMINATING AND FILTERING WATER PASSING THROUGH A SANITARY DEVICE

(75) Inventor: Horst Kunkel, Stuttgart (DE)

(73) Assignee: Hansa Metallwerke AG (DE)

(*) Notice: Subject to any disclaimer, the term of this patent is extended or adjusted under 35 U.S.C. 154(b) by 0 days.

(21) Appl. No.: 09/486,195

(22) PCT Filed: Jul. 14, 1998

(86) PCT No.: PCT/EP98/04374

§ 371 Date: May 17, 2000

§ 102(e) Date: May 17, 2000

(87) PCT Pub. No.: WO99/10283

PCT Pub. Date: Mar. 4, 1999

(30) Foreign Application Priority Data

Aug. 22, 1997 (DE) .............................................. 197 36 632

(51) Int. Cl.[7] .................................. C02F 1/32; C02F 9/00; B01D 29/23; B01D 29/27; B01J 19/12
(52) U.S. Cl. ..................... 210/198.1; 210/748; 210/205; 210/256; 210/259; 210/407; 422/186.3
(58) Field of Search ..................................... 210/748, 256, 210/198.1, 407, 205, 259; 422/24, 186.3

(56) References Cited

U.S. PATENT DOCUMENTS 3,551,091 * 12/1970 Veloz .
4,694,179 * 9/1987 Lew et al. .
4,766,321 * 8/1988 Lew et al. .
5,529,689 * 6/1996 Korin .

* cited by examiner

*Primary Examiner*—Thomas M. Lithgow

(57) ABSTRACT

The invention relates to a device for degerminating and filtering water passing through a sanitary appliance. The device includes a housing through which water can flow, and a filtering device located inside of the housing. The filtering device has a backup cage and a filter cloth bag connected thereto, and essentially surrounds the entire luminous element of a UV lamp. Both the backup cage and the filter cloth bag are made from a plastic material which allows the radiation emitted by the UV lamp to pass through it or which conducts the radiation in the manner of a light conductor.

9 Claims, 3 Drawing Sheets

DEVICE FOR DEGERMINATING AND FILTERING WATER PASSING THROUGH A SANITARY DEVICE

Figure 1:
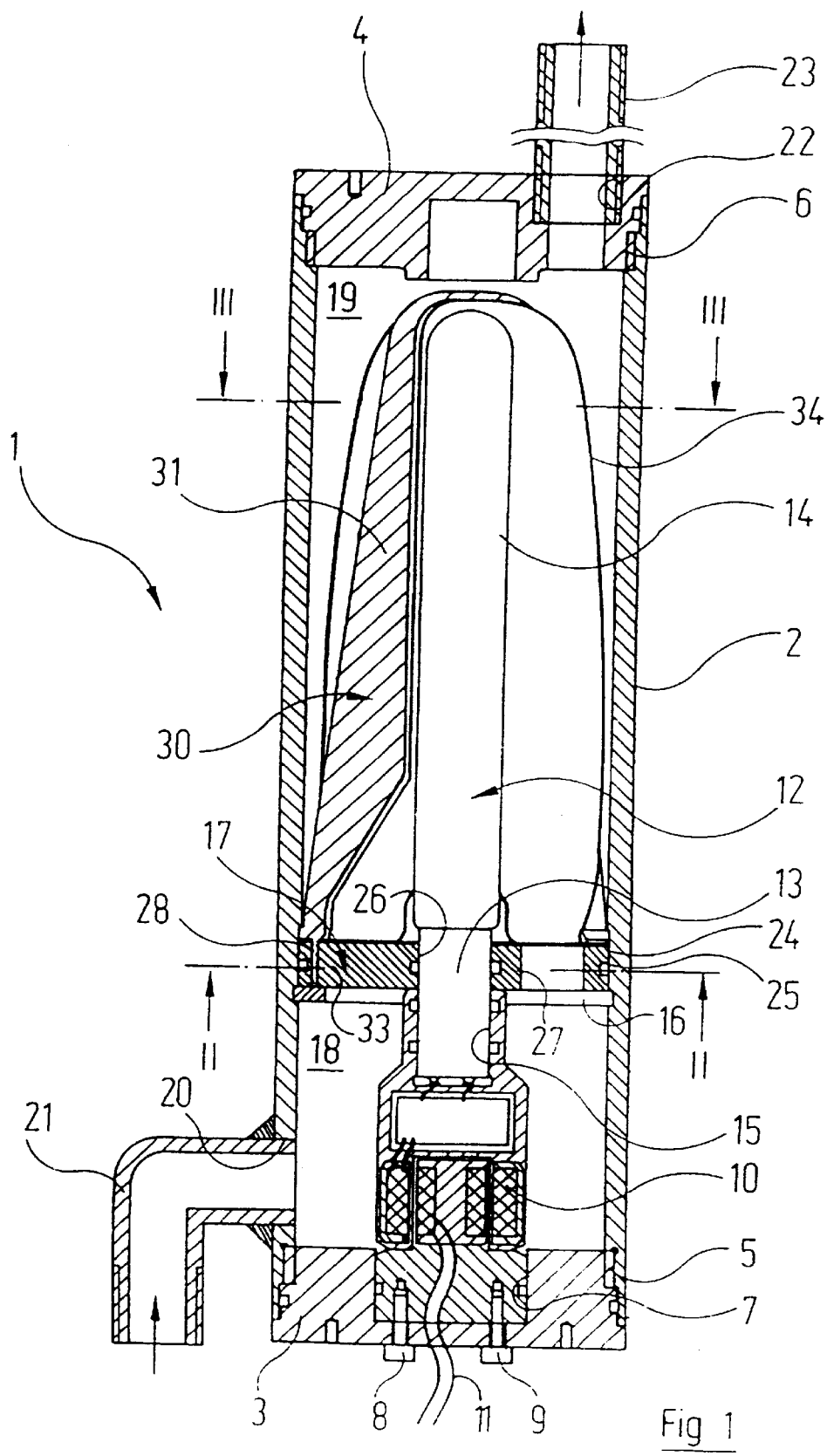

The invention relates to a device for sterilizing and filtering water flowing through a sanitary appliance, having a) a housing, which comprises an inlet and an outlet for the water;

b) a filtering apparatus, which is disposed in the housing and through which the water travelling between the inlet and the outlet of the housing has to flow;

c) a UV lamp, which is disposed inside the housing and the radiation of which is directed towards the water flowing through and towards the filtering apparatus.

In recent years the dangers arising in the field of sanitation from water contaminated with micro-organisms, in particular bacteria, amoebae or other monocellular organisms, have become ever clearer. For said reason, increased importance is being attached to water sterilization. In said connection, there have been reports of experiments to sterilize flowing water through exposure to UV light, which is of a wavelength suitable for killing micro-organisms carried along in the water. To extend the retention time of said micro-organisms in the region of the UV lamp, use was made of filtering apparatuses, by which the micro-organisms were retained. The known filtering apparatuses however comprised solid substances and had a relatively low efficiency. After only slight penetration into the material of said filtering apparatuses the monocellular organisms were no longer accessible to the UV light. What is more, said known filtering apparatuses considerably restricted the water flow.

The object of the present invention is to indicate a device of the type described initially, which improves the efficiency of the filtering operation itself and the effectiveness of sterilization by means of UV radiation.

Said object is achieved according to the invention in that the filtering apparatus comprises:

d) a filter cloth bag made of knitted or woven plastic material which transmits, in particular guides, UV light;

e) a supporting cage, which lends the filter cloth bag a specific shape and is likewise made of a plastic material which transmits, in particular guides, UV light, wherein f) the filtering apparatus surrounds the luminous element of the UV lamp.

The present invention therefore brings together two ideas: firstly, the filter material no longer comprises solid substances, which for their mechanical stability have to have a considerable minimum thickness and moreover provide a relatively small effective filtering surface, but a knitted or woven plastic cloth. The supporting cage provided according to the invention lends said cloth such a shape that it may surround the entire luminous element of the UV lamp. The filter cloth may be relatively thin; it is light and mechanically stable and is optionally also exchangeable without difficulty. The second inventive idea, by means of which the effectiveness of the UV radiation is markedly further improved, lies in making the material, from which the filter cloth bag and the supporting cage are made, capable of transmitting the light emitted by the UV lamp. This has the advantage that even micro-organisms lying deeper in the filter cloth may be reached and killed by the UV light. Given a suitable selection of material, it is even possible to achieve the effect whereby filter cloth bag and supporting cage serve as a "light guide" for the light emitted by the UV lamp, which guides said light in a concentrated manner into the regions of the filtering apparatus which are more remote from the UV lamp.

It is advantageous when the filter cloth bag is folded a plurality of times in radial direction. By said means the effective filtering surface is further increased, which extends the retention time and reduces flow restriction.

Particularly preferred in said case are embodiments, in which the filter cloth bag is composed of individual webs, which at their edges directed towards one another are two-dimensionally connected to one another in such a way that the end faces are exposed and point towards the luminous element of the UV lamp. In said case, the light emitted by the UV lamp may namely enter at the end faces highly effectively into the material of the filter cloth bag.

A possible refinement of the supporting cage is such that it comprises a plurality of radially aligned ribs, which at one end are connected in a cupola-like manner to one another and against the internal contours of which the filter cloth bag is supported. In said manner, a highly stable formed body is inexpensively produced, which may optionally be easily removed from the device for the purpose of exchange.

The ribs should have an internal contour which at least over a specific distance extends parallel to the luminous element of the UV lamp. It is thereby guaranteed that all of the material of the filter cloth bag fastened to the internal contour of the ribs is easily reached by the UV light.

An alternative refinement of the supporting cage is such that it is formed from rod-like material.

It is least expensive when the supporting cage is formed from plastic ropes, which are stretched over a part situated in the housing. The supporting cage is in said case no longer dimensionally stable from the start but receives its "bearing" or "supporting" function only when the ropes are stretched after installation of the filtering apparatus inside the housing of the device.

It is particularly advantageous in terms of cost when the actual part, which is situated in the housing and over which the plastic ropes are stretched, is the luminous element of the UV lamp. In said manner, the entire filtering apparatus is adapted without special additional measures to the shape of the UV lamp.

Particularly advantageous in terms of assembly is the refinement of the filtering apparatus, in which the filter cloth bag is fastened to the supporting cage by means of fastening clips. Said embodiment optionally also enables an exchange of the filter cloth bag alone when the latter, after a specific operating period, is totally clogged with impurities.

Figure 2:
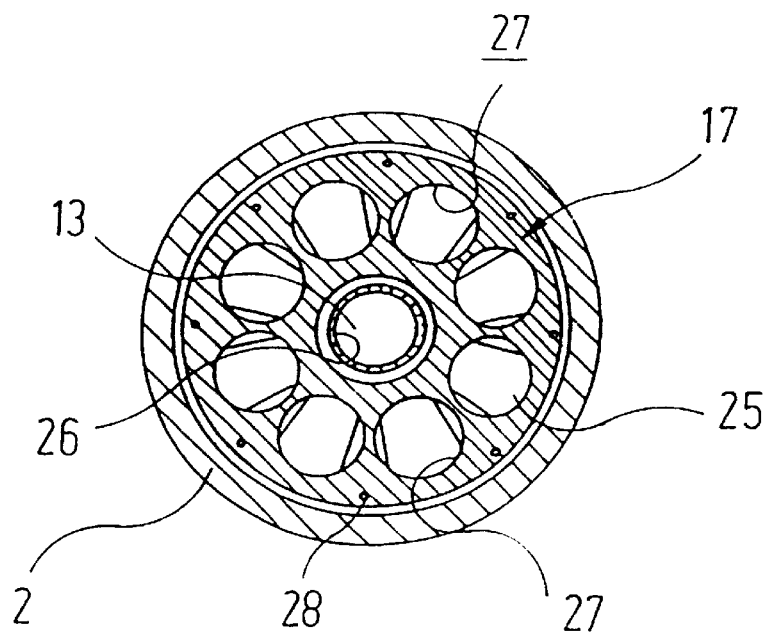
Figure 3:
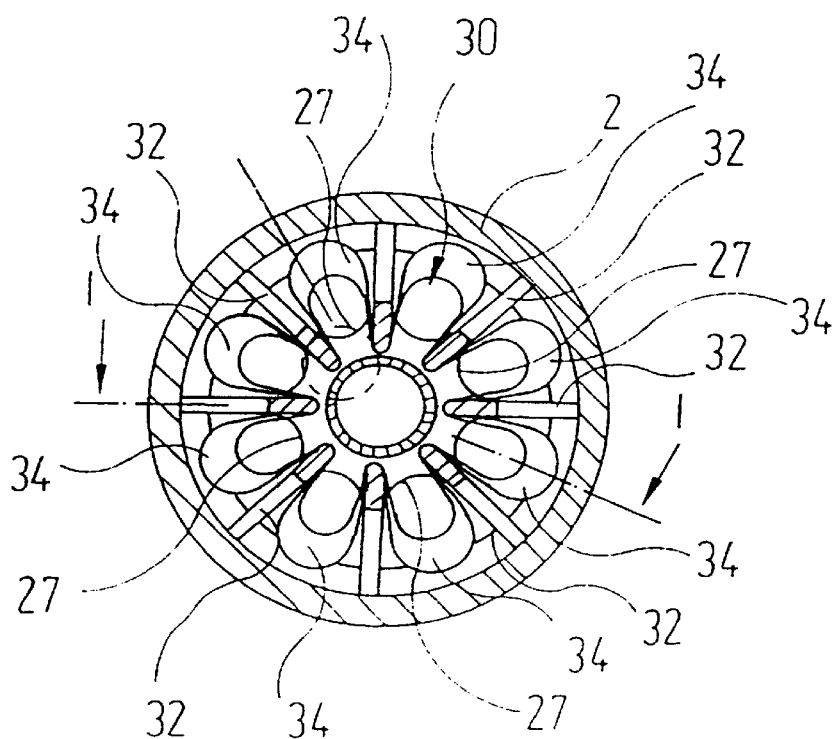
Figure 4:
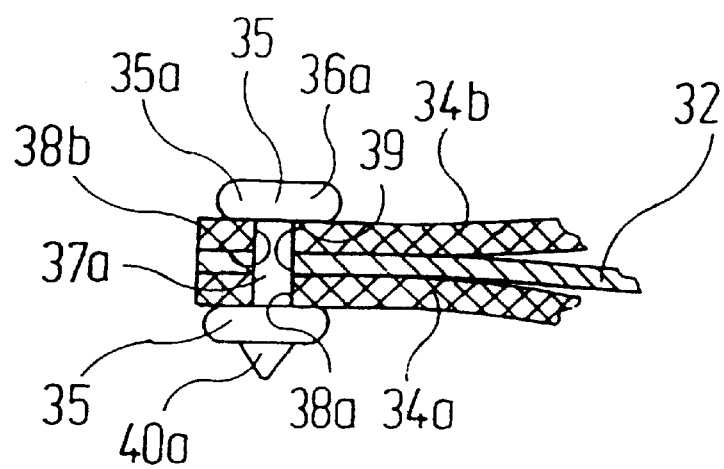
Figure 5:
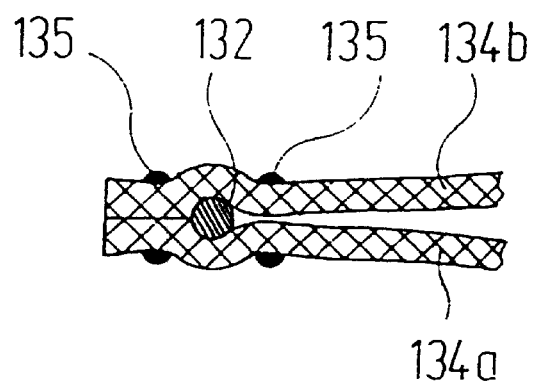

Embodiments of the invention are described in greater detail below with reference to the drawings; said drawings show:

FIG. 1 an axial section through a device for sterilizing and filtering water, which may be housed in a sanitary appliance;

FIG. 2 a section along line II—II of FIG. 1;

FIG. 3 a section along line III—III of FIG. 1;

FIG. 4 a first possible refinement of the radially inward directed edges of the filtering apparatus, which may be used in the device of Figure;

FIG. 5 a second possible such refinement.

The device for sterilizing and filtering water, which is illustrated in FIG. 1, is intended for installation in a water channel of a sanitary appliance. All of the dimensions are therefore such that they fit in such a flow channel. The device, which is denoted as a whole by the reference character 1, comprises a substantially cylindrical housing 2 which is closed at the opposite ends by a base 3 and a lid 4. The connection between the housing 2 and the base 3 or lid 4 is effected in the illustrated embodiment with the aid of threads 5, 6 so that, after removal of said components, the interior of the housing 2 is accessible.

A connection backplate 10, which is used to receive an elongate UV lamp 12, is fastened with the aid of screws 8, 9 in a recess 7 at the inside of the base 3. In the illustrated embodiment, the connection backplate 10 is of a multi-part design and comprises various electronic components, which are used for the power supply and control of the UV lamp 12 and are irrelevant in the present context. A supply cable 11 is run, in a suitable manner not presently of interest, out of the housing 2 and through the base 3 and is used for the electrical power supply.

The UV lamp 12 is subdivided into a cap region 13, which is used for the electrical connection, and a luminous element 14. The cap region 13 is releasably introduced into the location opening 15 of the connection backplate 10 fastened to the base 3. The luminous element 14 takes the form of a cylindrical rod and extends coaxially with the cylindrical housing 2 up into the vicinity of the lid 4.

With the aid of a snap ring 16, which may snap into a groove in the inner surface of the cylindrical housing 2, an intermediate plate 17 is fixed in the interior of the housing 2 and subdivides the interior of the housing 2 into an afflux chamber 18 and a treatment chamber 19. The afflux chamber 18 substantially surrounds the connection backplate 10 connected to the base 3, while the treatment chamber 19 surrounds the luminous element 14 of the UV lamp 12.

Welded in a lateral opening 20, which penetrates the cylindrical housing 2, is an angled connection piece 21 used to feed water into the afflux chamber 18 inside the housing 2. In the lid 4 a paraxial bore 22 is provided, into which is screwed a discharge connection piece 23, through which the purified water passes back out of the device 1.

The precise design of the intermediate plate 17 is evident from FIG. 2, which shows a section according to line II—II of FIG. 1. It may be seen that the intermediate plate 17 in its cylindrical lateral surface 24 has an annular groove 25, into which a sealing ring (not shown) may be inserted where necessary. The intermediate plate 17 comprises a central location opening 26, through which the cap region 13 of the UV lamp 12 may be pushed—in FIG. 1—from above. A plurality of flow openings 27, which lie on a circle surrounding the location opening 26, connect the afflux chamber 18 to the treatment chamber 19 inside the device 1. Likewise on a circle, but situated close to the outside edge of the intermediate plate 17, a plurality of fastening openings 28 are worked into the latter, which fastening openings have a relatively small diameter and are used to fasten a filtering apparatus, which as a whole is provided with the reference character 30.

The precise design of said filtering apparatus 30 is evident from FIGS. 1 and 3.

The filtering apparatus 30 comprises a supporting cage 31 as well as a filter cloth bag 34 carried by the latter.

In the embodiment illustrated in FIGS. 1 to 4, the supporting cage 31 of the filtering apparatus 30 comprises a plurality of plate-shaped, "fin-like" ribs 32, which are radially aligned with the axis of the housing 2. All of said ribs 32 at their bottom end directed towards the intermediate plate 17 are provided with a pointed retaining lug 33, which is pushed into a corresponding fastening opening 28 of the intermediate plate 17.

The supporting cage 31 is made of a plastic material which is capable of guiding UV light in a relatively loss-free manner or capable of transmitting said light.

The radially outer contour of the individual ribs 32 of the supporting cage 31 is formed in such a way that with increasing distance from the intermediate plate 17 said contour maintains a greater distance from the cylindrical housing 2 of the device 1; the precise shaping in said region is however unimportant. The radially inner contour of the ribs 32, which is directed towards the luminous element 14 of the UV lamp 12, extends from the top "cupola-like" end of the supporting cage 1 initially relatively close and parallel to the luminous element 14 and is then set back by means of an inclination in a radially outward direction to approximately the diameter, in which the fastening lugs 33 are situated.

The filter cloth bag 34 is a woven or knitted textile fabric made of a material which likewise transmits or guides UV light. The filter cloth bag 34 is composed of individual webs 34a, 34b in the manner evident from FIG. 3 and FIG. 4. Extending in each case between the inner-lying edges of the ribs 32 are webs 34a, 34b, . . . of the filter cloth bag 34, which are U-shaped in diameter and fastened by their edges to the radially inner edge of the ribs 32 of the supporting cage 31 in the manner evident from FIG. 4; the edge of the one web 34a is applied flat against the one side of the appropriate rib 32, the edge of the adjacent web 34b is applied flat against the opposite side of the rib 32. The result is a pronounced "fold" of the filter cloth bag 34, which fold is held "in shape" by the appropriate rib 32 of the supporting cage 31. The arrangement is clearly such that the end faces of the two webs 34a and 34b and of the rib 32 are exposed and point in towards the luminous element 14 of the UV lamp 12.

The edges of the two webs 34a and 34b are held firmly against the rib 32 by means of plastic clips 35. Said plastic clips 35 comprise a first part 35a having an enlarged, outer-lying head 36a, a shank 37a which is passed through aligned bores 38a, 38b of the webs 34a, 34b as well as a bore 39 of the rib 32 aligned therewith, as well as a locking tip 40a having an enlarged diameter compared to the shank 37a. The second part 35b of the plastic clip 35 is of approximately the same shape as the head 36a of the first part 35a and has a through-bore, which is slightly greater than the diameter of the shank 37a of the first part 35a but slightly smaller than the maximum diameter of the locking tip 40a. Thus, the locking tip 40a may be passed with elastic compression through the through-bore of the second part 35b of the plastic clip, whereupon it springs back and hence effects a latching connection.

The device 1 described above operates as follows:

When the sanitary appliance, e.g. a draw-off appliance having the device 1 installed in its flow channel, is opened, water flows through the connection piece 21 into the afflux chamber 18 inside the housing 2. The UV lamp 12 is switched on. The water having entered the afflux chamber 18 flows on from there through the flow openings 27 in the intermediate plate 17 into the treatment chamber 19, namely at the radially inner-lying side of the filter cloth bag 34. The water passes through said filter cloth bag 34, wherein particles which are contained in the water and are to be filtered out, but in particular micro-organisms such as amoebae and similar monocellular organisms, are retained by the filter cloth bag 34. The thus purified water passes into the part of the treatment chamber 19 lying outside of the filter cloth bag 34 and flows off from there through the discharge connection piece 23 and towards the outlet of the sanitary appliance.

The water, as it passes through the treatment chamber 19, is exposed to the disinfecting rays of the UV lamp 12. The micro-organisms trapped in the filter cloth bag 34 are reliably killed under the influence of the UV radiation. The effect of said UV radiation extends far into material of the filter cloth bag 34 owing to the UV-transmitting or UV-guiding capacity so that, there, even deeper-lying microorganisms may be reached and killed. The light-guiding action of filter cloth bag 34 and ribs 32 of the supporting cage 31 is further intensified by the formation of the "folds" in the filter cloth bag 34 shown in FIG. 4; at the bluntly cut end faces of said parts directed radially in towards the luminous element 14 of the UV lamp 12 the UV light may easily enter with low reflection and propagate on from there in the manner of a light guide.

In the embodiment described above, the supporting cage comprised the various ribs 32 connected in a cupola-like manner to one another in the top region. In another embodiment of the invention, said ribs are replaced by round rods which, in a similar manner to the inner contour of the ribs 32 in the embodiment of FIGS. 1 to 4, determine the shape of the fold. FIG. 5 shows, for such a case, the refinement of the edge region of a fold of a filter cloth bag 134; the two webs 134a and 134b of the filter cloth bag 134 are applied flat against one another in such a way that they enclose the round material 132 made of UV-guiding plastic material and their end faces, as in the embodiment of FIG. 4, are directed freely towards the luminous element of the UV lamp. Provided on either side of the round material 132 are plastic clips 135, which fix the arrangement shown in FIG. 5.

A third embodiment is not shown in the drawings. In said embodiment, the supporting cage by means of plastic ropes, which are sewn to the material of the filter cloth bag, is placed together with the filter cloth bag over the luminous element of the UV lamp and clamped in place by means of a split ring, which forms the open end of the filtering apparatus.

What is claimed is:

1. Device for sterilizing and filtering water flowing through a sanitary appliance, having
   a) a housing, which comprises an inlet and an outlet for the water;
   b) a filtering apparatus, which is disposed in the housing and through which the water travelling between the inlet and the outlet of the housing has to pass;
   c) a UV lamp having a luminous element (14), which is disposed inside the housing and the radiation of which is directed towards the water flowing through and towards the filtering apparatus;
   characterized in that the filtering apparatus (30) comprises:
   d) a filter cloth bag (34) made of knitted or woven plastic material which transmits UV light;
   e) a supporting cage (31), which lends the filter cloth bag (34) a specific shape and is likewise made of a plastic material which transmits UV light; wherein
   f) the filtering apparatus (30) surrounds the luminous element (14) of the UV lamp (12) and
   the filter cloth bag (34) is composed of individual webs (34a, 34b), which at their edges directed towards one another are connected in a two-dimensional manner to one another in such a way that the end faces are exposed and point towards the UV lamp (12).

2. Device according to claim 1, characterized in that the filter cloth bag (34) is folded a plurality of times in radial direction.

3. Device for sterilizing and filtering water flowing through a sanitary appliance, having
   a) a housing, which comprises an inlet and an outlet for the water;
   b) a filtering apparatus, which is disposed in the housing and through which the water travelling between the inlet and the outlet of the housing has to pass;
   c) a UV lamp having a luminous element (14), which is disposed inside the housing and the radiation of which is directed towards the water flowing through and towards the filtering apparatus;
   characterized in that the filtering apparatus (30) comprises:
   d) a filter cloth bag (34) made of knitted or woven plastic material which transmits UV light;
   e) a supporting cage (31), which lends the filter cloth bag (34) a specific shape and is likewise made of a plastic material which transmits UV light; wherein
   f) the filtering apparatus (30) surrounds the luminous element (14) of the UV lamp (12) and
   g) the supporting cage (31) comprises a plurality of radially aligned ribs (32), which at one end are connected in a cupola-like manner to one another and against the radially inner contours of which the filter cloth bag (34) is supported.

4. Device according to claim 1, characterized in that the supporting cage (31) comprises a plurality of radially aligned ribs (32), which at one end are connected in a cupola-like manner to one another and against the radially inner contours of which the filter cloth bag (34) is supported.

5. Device according to claim 4, characterized in that the ribs (32) have radially inner contour which, at least over a specific distance, extends parallel to the luminous element (14) of the UV lamp (12).

6. Device according to one of claims 1 to 2, characterized in that the supporting cage is formed from rod-like material.

7. Device according to claim 1, characterized in that the supporting cage is formed from plastic ropes, which are stretched over a part situated in the housing.

8. Device according to claim 7, characterized in that the part situated in the housing is the luminous element of the UV lamp.

9. Device according to claim 1, characterized in that the filter cloth bag (34) is fastened to the supporting cage (31) by means of fastening clips (35).

* * * * *